(12) United States Patent
Hansson et al.

(10) Patent No.: US 12,190,110 B2
(45) Date of Patent: Jan. 7, 2025

(54) METHOD AND PROCESSING UNIT FOR GENERATING OUTPUT FEATURE MAP DATA

(71) Applicant: Arm Limited, Cambridge (GB)

(72) Inventors: Peter Mattias Hansson, Löddeköpinge (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 60 days.

(21) Appl. No.: 18/312,884

(22) Filed: May 5, 2023

(65) Prior Publication Data

US 2023/0367592 A1    Nov. 16, 2023

(30) Foreign Application Priority Data

May 16, 2022    (GB) ..................................... 2207130

(51) Int. Cl.
  *G06F 9/30*    (2018.01)
  *G06F 9/345*   (2018.01)
  (Continued)

(52) U.S. Cl.
  CPC ............ *G06F 9/3001* (2013.01); *G06F 9/345* (2013.01); *G06N 3/02* (2013.01); *G06N 3/063* (2013.01); *G06N 3/048* (2023.01)

(58) Field of Classification Search
  CPC ......... G06F 9/3001; G06F 9/345; G06N 3/02; G06N 3/063; G06N 3/048
  See application file for complete search history.

(56) References Cited

U.S. PATENT DOCUMENTS 7,199,897 B2*  4/2007  Nomizu ................. G06V 10/56
                                               358/1.9
7,411,694 B2*  8/2008  Nomizu .................... G06T 5/00
                                               358/1.16
(Continued)

FOREIGN PATENT DOCUMENTS

CN        111865321 A       10/2020
JP      2007189391 A         7/2007
(Continued)

OTHER PUBLICATIONS

Park et al.; Modified Convolution Neural Network for Highly Effective Parallel Processing; 2017; IEEE (Year: 2017).*
(Continued)

*Primary Examiner* — Corey S Faherty
(74) *Attorney, Agent, or Firm* — EIP US LLP

(57) ABSTRACT

A method comprising obtaining first, real, data to be processed. It is determined, based on a number of computation resources of a set of computation resources of a processing unit available for use during a processing cycle, to process at least a portion of the first data using a first subset of the set and to load second, artificial, data into a second subset of the set, disjoint from the first subset of the set, the second data comprising at least one artificial data element. In a processing cycle, at least the portion of the first data and the second data are loaded into first and second subsets of the set, respectively. The second subset is an artificially activated subset. The second data is inhibited from affecting output feature map data, which is generated based at least in part on the computational result.

20 Claims, 6 Drawing Sheets

(51) Int. Cl.
*G06N 3/02* (2006.01)
*G06N 3/063* (2023.01)
*G06N 3/048* (2023.01)

(56) References Cited

U.S. PATENT DOCUMENTS

| | | | |
|---|---|---|---|
| 11,394,980 B2* | 7/2022 | Andreopoulos | ... H04N 21/2662 |
| 2023/0079975 A1* | 3/2023 | Saeed | ............... G06N 3/048 |
| | | | 713/320 |

FOREIGN PATENT DOCUMENTS

| | | |
|---|---|---|
| JP | 2008072164 A | 3/2008 |
| WO | 2020017026 A2 | 1/2020 |

OTHER PUBLICATIONS

UKIPO Combined Search and Examination Report dated Oct. 18, 2022 for Application No. GB2207130.2.

* cited by examiner

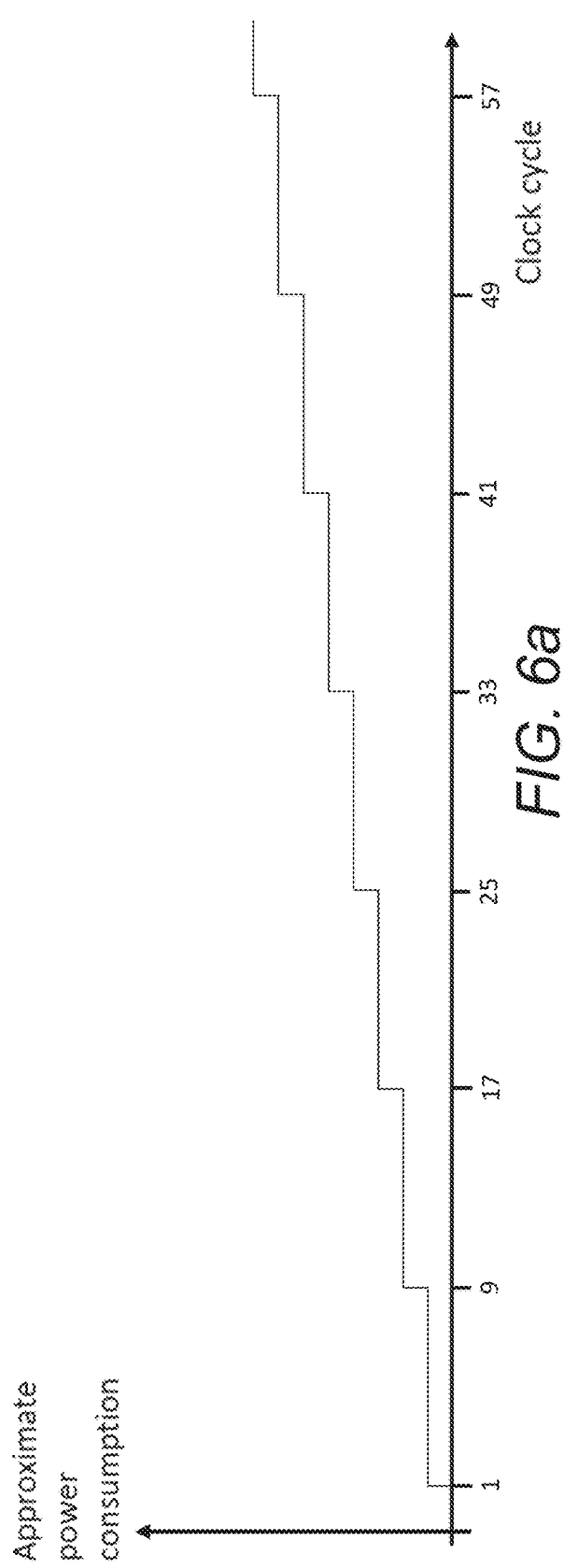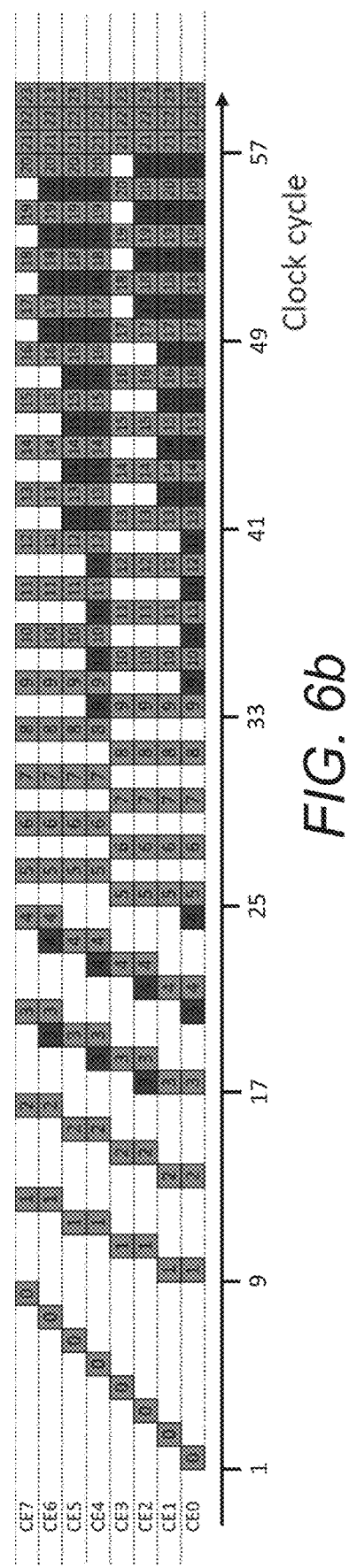
FIG. 6a
FIG. 6b

METHOD AND PROCESSING UNIT FOR GENERATING OUTPUT FEATURE MAP DATA

CROSS-REFERENCE TO RELATED APPLICATIONS

This application claims priority to United Kingdom Application No. GB 2207130.2, filed May 16, 2022, under 35 U.S.C. § 119(a). The above-referenced patent application is incorporated by reference in its entirety.

BACKGROUND

Technical Field

The present invention relates to a method and processing unit for generating output feature map data.

Background

Neural networks have emerged as powerful tools for image processing, inference, machine learning, and related tasks. Neural networks may include convolutional layers. In a convolutional layer, an output feature map (OFM) comprising OFM data is computed via convolutions between input feature map (IFM) data of an IFM, and a matrix of weights.

The convolutional computations account for a significant portion of the computational cost of performing inference or training for a neural network, both in terms of processing time and in terms of the power required to switch bits within registers. Since these computations are performed repeatedly during inference or training, specialised integrated circuits called hardware accelerators have been developed.

A neural processing unit (NPU) is a hardware accelerator which is specialised for processing data in accordance with neural networks, for example, convolutional neural networks (CNNs). An NPU includes an array of specialised convolution engines (CEs), which each contain multiply-accumulate (MAC) hardware to perform convolutional operations.

The power consumption by the MAC hardware ranges a large span between different neural network models and different IFMs. In some scenarios, the power consumed by the MAC hardware can be significantly higher than by the rest of the NPU. Processing of an input data array can lead to sudden and extreme changes in NPU power consumption in a single clock cycle, which may go beyond the limits of what the surrounding power supply system can handle. This in turn can lead to sudden increases or decreases in on-chip voltage, which may result in hold, set-up and clock skew violations, and may cause the NPU to crash.

It is desirable to reduce the amount of change in power consumption by the NPU between clock cycles, and/or to reduce the average time derivative of the power consumed by the NPU. It is desirable to provide these effects in a straightforward manner and/or without utilising additional storage.

SUMMARY

According to a first aspect of the present invention, there is provided a method for generating output feature map data during operation of neural network processing by a processing unit, the processing unit comprising a plurality of computation resources. The method comprises obtaining first, real, data to be processed and determining, based on a number of computation resources of a set of the plurality of computation resources available for use during a processing cycle of the processing unit, to process at least a portion of the first data using a first subset of the set and to load second, artificial, data into a second subset of the set, disjoint from the first subset of the set, the second data comprising at least one artificial data element. The method comprises obtaining the second data and, in the processing cycle: loading at least the portion of the first data into the first subset of the set, causing the first subset of the set to generate a computational result; and loading the second data into the second subset of the set, the second subset of the set being an artificially activated subset of the set. The method comprises inhibiting the second data from affecting the output feature map data. The method comprises generating the output feature map data based at least in part on the computational result.

This approach for example allows the computation resources to remain synchronized with each other, so that each computation resource in a given processing cycle operates on either a respective portion of the same (real) input data as each other or artificial data. For example, by loading and/or processing the artificial data using a subset of the computation resources during the processing cycle instead of using that subset of the computation resources to move on to processing of a subsequent set of input data, the artificial data can be used to maintain synchronicity among the computation resources. This allows input data to be processed more straightforwardly than other approaches in which different computation resources process different sets of input data during the same processing cycle. Compared to the present approach, these other approaches may be more complex and involve the usage of additional storage to store the two different sets of input data at the same time as each other, as well as requiring additional processing logic to handle multiplexing of the different sets of input data.

In some examples, the method comprises: obtaining ramping, real, data; in a ramping processing cycle of the at least one processing cycle, different from the processing cycle, loading the ramping data into a ramping set of the plurality of computation resources, different from the set of the plurality of computation resources, to generate a ramping computational result; and generating the output feature map data based at least in part on the ramping computational result. By using a ramping set of the plurality of computation resources, the power consumption may be altered more gradually than otherwise. This can in turn reduce the risk of hold, set-up and clock skew violations. The artificial data can be used to occupy the second subset of the computation resources during a given processing cycle so as to provide for more gradual ramping in power consumption, for example while maintaining synchronicity in the (real) input data processed by the first subset of the computation resources.

In some examples, the ramping processing cycle is before the processing cycle and there are fewer computation resources in the ramping set of the plurality of computation resources than in the set of the plurality of computation resources. In other examples, though, the ramping processing cycle is before the processing cycle and there are more computation resources in the ramping set of the plurality of computation resources than in the set of the plurality of computation resources. In other words, approaches herein may be used to ramp up or ramp down power consumption, so as to reduce hold, set-up and clock skew violations upon commencing processing of data or upon starting to cease processing of the data.

In some examples, the number of computation resources is n, the first data comprises m input data elements to be processed to obtain m output data elements, the computational result is based on at least one of the m output data elements, and m is indivisible by n without leaving a remainder. In this way, the artificial data is loaded into the second subset of the n available computation resources if the m input data elements cannot be processed by a respective computation resource of the n available computation resources without leaving at least one of the available computation resources idle during a processing cycle. For example, the artificial data can be processed by the at least one of the available computation resources that would otherwise either be left idle or be used to process subsequent input data (which would complicate processing further and may utilise additional storage, as explained above).

In some of these examples, m is a power of two and determining to process the first data using the first subset of the set and to process the second data using the second subset of the set is based on n being a non-power-of-two. This approach allows a determination to process the second data to be performed straightforwardly, based merely on the number of input and/or output data elements compared to the number of computation resources that are available during a given processing cycle. In some cases, m may be pre-programmed or otherwise pre-defined. In such cases, if m is a power of two, the determination to process the second data using the second subset may be based merely on identifying that the number of available computation resources, n, for the processing cycle is not a power of two. It is to be appreciated that the number of computation resources may vary over time, such that some processing cycles have a different number of computation resources available than others (e.g. if a ramping-up or ramping-down process is used, to gradually increase or decrease the number of available computation resources over time, respectively). In such cases, a combination of real and artificial data may be processed in at least one processing cycle (e.g. if the number of computation resources, n, for the at least one processing cycle is a non-power-of-two) and solely real data may be processed in at least one other processing cycle (e.g. if the number of computation resources, n, for the at least one other processing cycle is a power of two).

In some examples, the first data comprises m input data elements to be processed to obtain m output data elements, the computational result is based on at least one of the m output data elements, and the method comprises processing a different respective subset of the m input data elements in each of a plurality of processing cycles comprising the processing cycle. In this way, the processing of the m input data elements can be spread out across a plurality of processing cycles, which can aid in more gradually changing the power consumption compared to, for example, processing no input data elements in one processing cycle and then processing all of the m input data elements in the immediately subsequent processing cycle.

In some of these examples, each subset of the m input data elements comprises the same number of m input data elements as each other. However, in other examples, a first subset of the m input data elements processed in a first processing cycle of the plurality of processing cycles comprises a different number of m input data elements than a second subset of the m input data elements processed in a second processing cycle of the plurality of processing cycles. The methods herein may thus allow the available computation resources to be used flexibly.

In some examples, the first data comprises m input data elements to be processed to obtain m output data elements, the computational result is based on at least one of the m output data elements, and the method comprises processing each of the m input data elements using a different respective computation resource of the plurality of computation resources. Using a different computation resource to process each of the m input data elements for example reduces the complexity of processing and provides for parallelization.

In some examples, the first data comprises m input data elements and further, real, data to be processed with each of the m input data elements to obtain m output data elements, and the computational result is based on at least one of the m output data elements. As explained herein, the methods herein may therefore be used to maintain synchronicity, so that the same real input (the further, real, data) is processed with each of the m input data elements in order to obtain the desired m output data elements. In some of these examples, each of the m input data elements represents a respective weight and the further data represents at least part of a block of an input feature map.

In some of these examples, the method comprises, in the processing cycle: activating a first activated subset of activated computation resources of the plurality of computation resources for processing a first subset of the m input data elements with the further data, the set comprising the first activated subset; and maintaining a first deactivated subset of deactivated computation resources of the plurality of computation resources; and in a further processing cycle of the processing unit: activating a second activated subset of activated computation resources of the plurality of computation resources, different from the first activated subset, for processing a second subset of the m input data elements with the further data, different from the first subset of the m input data elements; and maintaining a second deactivated subset of deactivated computation resources of the plurality of computation resources, different from the first deactivated subset. In other words, different subsets of computation resources may be activated during different processing cycles, for example so as to maintain the number of available computation resources at a desired level over the processing cycles. This approach may thus be used to maintain or gradually alter power consumption as desired. For example, the number of computation resources may be the same in the processing cycle and the further processing cycle. However, the actual computation resources activated in the processing cycle and the further processing cycle may differ from each other, and may each be used to process different subsets of the m input data elements.

In some examples, the first data comprises m input data elements to be processed over c processing cycles to obtain m output data elements, the computational result is based on at least one of the m output data elements and the c processing cycles comprise the processing cycle; n computation resources of the plurality of computation resources are available per processing cycle of the c processing cycles such that n*c computation resources are available over the c processing cycles; m computation resources are utilised over the c processing cycles to process a different respective one of the m input data elements; and (n*c−m) computation resources are utilised over the c processing cycles to process artificial data, the artificial data comprising the second data. In other words, the computation resources available over the processing cycles that are surplus to the requirements for processing the m input data elements may be used for processing the artificial data (e.g. instead of processing input data elements of subsequent input data), so that the available computation resources remain synchronized with each other.

In some examples, the second data is derived from real data. This may mean that the amount of power consumed by the computation resources of the second subset is similar to the amount of power consumed by respective computation resources during processing of real data.

In some of these examples, the real data comprises an array of real data elements and deriving the second data from the real data comprises changing an order of the real data elements within the array. In other words, the order of the real data elements may be shuffled, allowing the second data to be derived straightforwardly from the real data. Shuffling in this manner means that the second data will not be the same as real data that has been processed immediately prior to the processing of the second data (even if the second data is derived from such real data). This will cause power to be consumed by processing of the second data, due to toggling of various bits of the second subset of the set of computation resources, which would not occur if the second data is exactly the same as the real data that was processed by the second subset of the set of computation resources immediately prior to the second data.

In some examples in which the second data is derived from real data, the method comprises, in a preceding processing cycle preceding the processing cycle, loading the real data into a preceding set of the plurality of computation resources, causing the preceding set to generate a preceding computational result; and generating the output feature map data based at least in part on the preceding computational result. This may mean that a number of bits of the computation resources which are toggled during the processing cycle is similar to a number of bits of the computation resources which are toggled during the preceding processing cycle, as the second data is derived from the real data processed in the preceding processing cycle.

In some examples in which the second data is derived from real data, the second data comprises at least one of: artificial input feature map data derived from the real data by a process comprising changing an order of real input feature map data elements within an array of real input feature map data elements comprised by the real data; or artificial weight data derived from the real data, wherein the real data comprises preceding real weight data processed by a preceding set of the plurality of computation resources during a preceding processing cycle preceding the processing cycle.

According to a second aspect of the present invention, there is provided a processing unit for generating output feature map data during operation of neural network processing, the processing unit comprising a plurality of computation resources, wherein the processing unit is configured to: obtain first, real, data to be processed; determine, based on a number of computation resources of a set of the plurality of computation resources available for use during a processing cycle of the processing unit, to process at least a portion of the first data using a first subset of the set and to load second, artificial, data into a second subset of the set, disjoint from the first subset of the set, the second data comprising at least one artificial data element; obtain the second data; in the processing cycle; load at least the portion of the first data into the first subset of the set, causing the first subset of the set to generate a computational result; and load the second data into the second subset of the set, the second subset of the set being an artificially activated subset of the set; inhibit the second data from affecting the output feature map data; and generate the output feature map data based at least in part on the computational result.

In some examples of the second aspect, the processing unit is configured to: obtain ramping, real, data; in a ramping processing cycle of the at least one processing cycle, different from the processing cycle, load the ramping data into a ramping set of the plurality of computation resources, different from the set of the plurality of computation resources, to generate a ramping computational result; and generate the output feature map data based at least in part on the ramping computational result.

In some examples of the second aspect, the number of computation resources is n, the first data comprises m input data elements to be processed to obtain m output data elements, the computational result is based on at least one of the m output data elements, and m is indivisible by n without leaving a remainder.

Further features will become apparent from the following description of examples, which is made with reference to the accompanying drawings.

BRIEF DESCRIPTION OF THE DRAWINGS

FIG. 6a shows a timeline for approximate power consumption of a neural processing unit according to further examples.

FIG. 6b shows a timing diagram for processing of IFM data according to further examples.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Neural networks are typically constructed from three types of layers. An input layer is the initial data for the neural network. An output layer provides the results for given inputs. One or more hidden layers are provided between the input layer and the output layer. The hidden layers may include convolutional layers. Other layers such as pooling layers and deconvolution layers and other structures such as recurrent neural networks may be present. In a convolutional layer, OFM data is generated via convolutions between IFM data and a set of weights.

Figure 1:
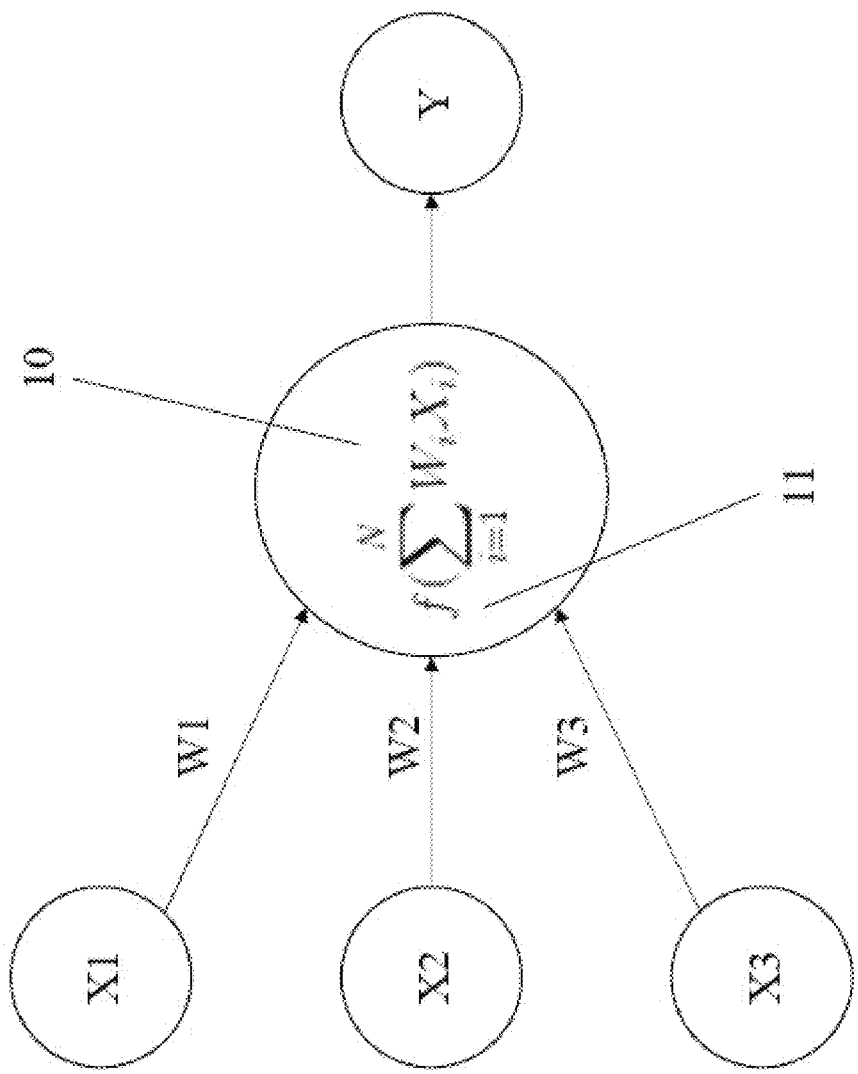
FIG. 1 shows an example of a multiply-accumulate operation performed during calculation of OFM data based on IFM data.

FIG. 1 shows an example of a multiply-accumulate operation 10 performed during calculation of OFM data using IFM data. The multiply-accumulate operation uses IFM data values (X1, X2 and X3), weights (W1, W2 and W3), and an activation function 11 to generate an OFM data value Y. Each IFM element, X1, X2, X3 is multiplied by a corresponding weight W1, W2, W3. The results of the multiplications of the IFM data values with their corresponding weights are added together to generate an accumulated result in step 10. The generation of the sum from the IFM data values and the weights may be referred to as taking a dot product of an IFM vector comprising the IFM data values and a weight vector comprising the corresponding weights. An activation function 11 is applied to the accumulated result to generate the OFM data value Y. The activation function 11 may be, for example, a sigmoid function or a hyperbolic tangent function.

There may be more than one OFM data value calculated based on a given set of IFM data values from the IFM. In such a case, a dot product between the same IFM data values X1, X2 and X3 and a different set of weights corresponds to a different OFM data value.

Figure 2:
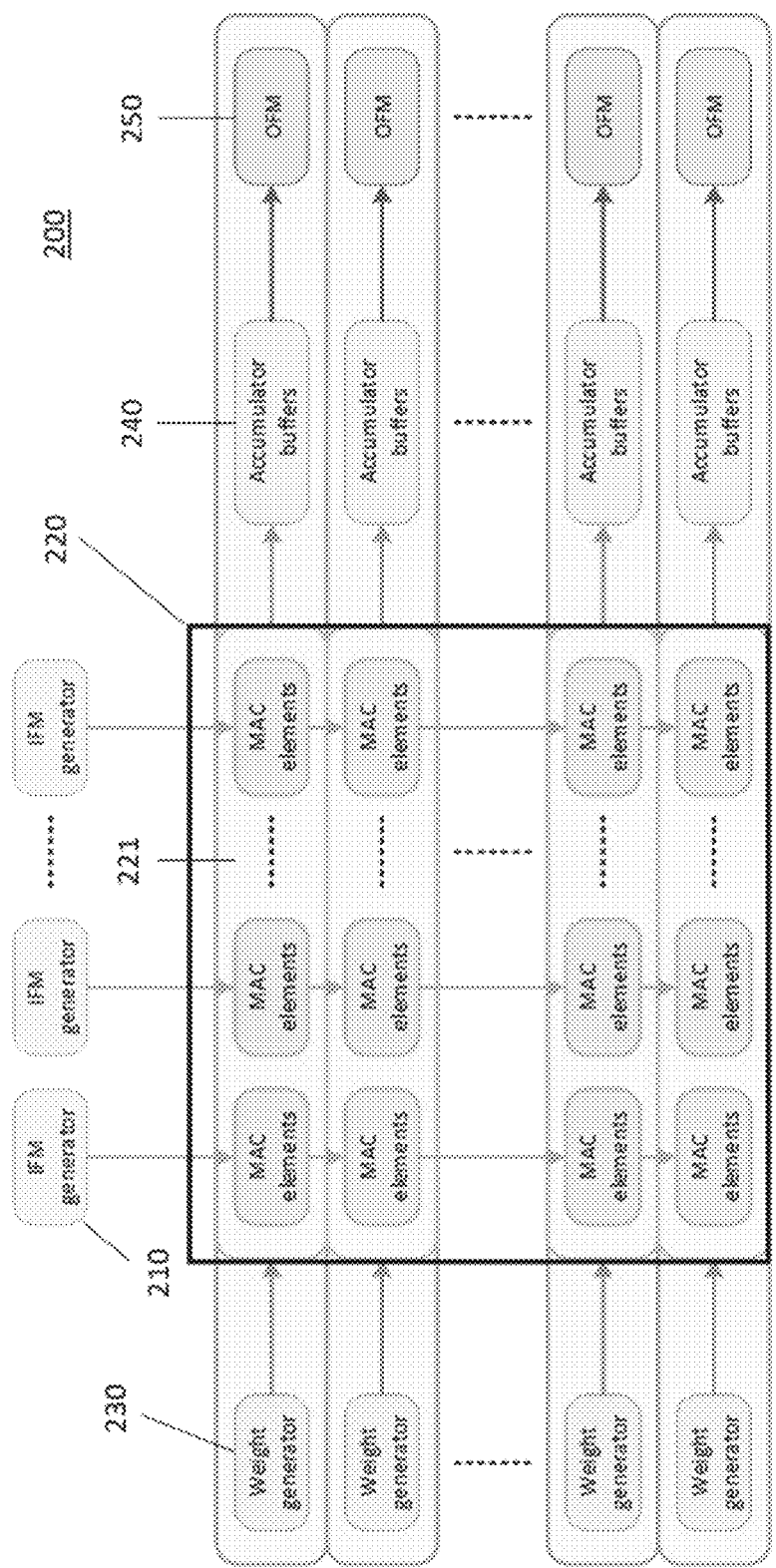
FIG. 2 is a schematic diagram of a neural processing unit.

FIG. 2 is a schematic diagram of a neural processing unit (NPU) 200. The NPU 200 is configured to accelerate the performance of calculations associated with neural networks by, amongst other things, efficiently performing multiply-accumulate operations described above in connection with FIG. 1 to generate OFM data.

The NPU 200 comprises IFM generators such as IFM generator 210. The IFM generators are arranged to provide IFM data to an array of MAC elements 220. During a given processing cycle, such as a clock cycle, an IFM generator may synchronously provide the same set of IFM data to every MAC element in the column of the array of MAC elements 220 corresponding to the IFM generator. The set of IFM data provided by one IFM generator is typically different from the IFM data provided by a different IFM generator. However, each row of MAC elements collectively receives the same set of data from the IFM generators. One row of MAC elements may be referred to as a computation resource or a convolution engine (CE) such as CE 221. The NPU 200 comprises a plurality of computation resources. The NPU 200 may comprise eight computation resources. The IFM generators may obtain the IFM data from a storage medium internal or external to the NPU 200 (not shown). IFM data that is to be used to generate OFM data may be referred to as real IFM data.

The NPU 200 comprises weight generators such as weight generator 230. The weight generators are arranged to provide weights to the array of MAC elements 220. One weight generator provides the same set of weights to every MAC element in the CE corresponding to the weight generator. The set of weights provided by one weight generator may be different from the set of weights provided by a different weight generator. In this way, each CE receives a different set of weights. The weight generators may receive the weights from a storage medium internal or external to the NPU 200 (not shown).

Each MAC element is configured to multiply at least one IFM data value by at least one weight. Each MAC element may be configured to multiply an IFM vector by a weight vector in accordance with the method shown in FIG. 1. Each CE 221 is associated with an accumulator buffer such as accumulator buffer 240. Each MAC element transfers the result of its multiplication to its associated accumulator buffer. Each accumulator buffer accumulates the results of the multiplications from each MAC element of its associated CE to produce an accumulated result. Each accumulator buffer transfers its accumulated result to an associated OFM channel such as OFM channel 250. The activation function 11 is applied to each accumulated result to generate OFM data values. The OFM is generated from the OFM data values.

Figure 3A:
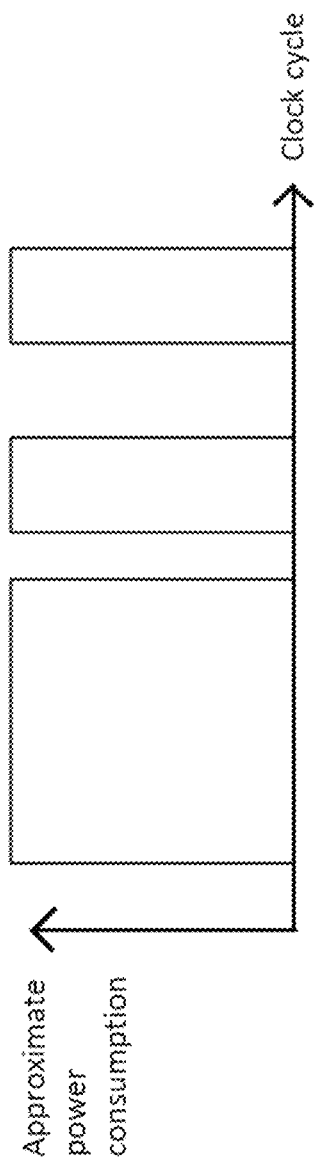
FIG. 3a shows a timeline for approximate power consumption of a neural processing unit.
Figure 3B:
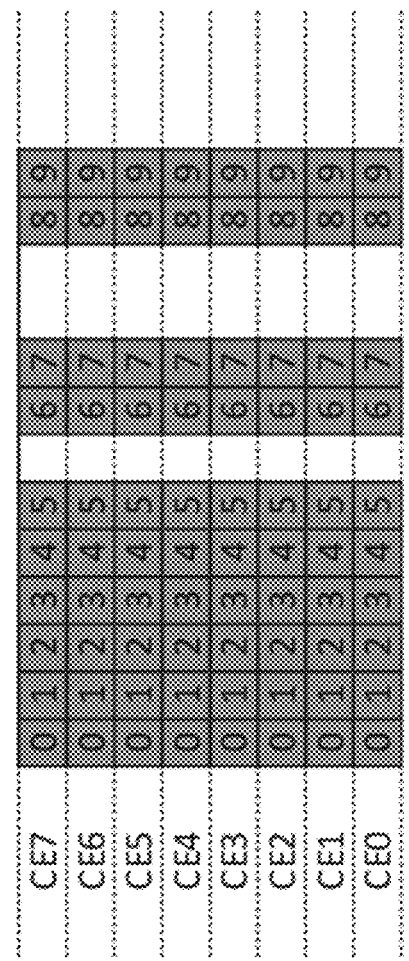
FIG. 3b shows a timing diagram for processing of IFM data.

FIG. 3a shows a timeline for approximate power consumption of a neural processing unit. FIG. 3b shows a timing diagram for processing of IFM data. The timeline of FIG. 3a pertains to the NPU 200 for which the timing of the processing of IFM data is shown in FIG. 3b.

Prior to and subsequent to processing of the IFM data, the CEs may be in an idle state. Furthermore, CEs may be idle during processing of an IFM, if there is a temporary lack of real IFM data or real weights for the CEs to process. In a given time period, the IFM generators may obtain and provide real IFM data if they have real IFM data, or may not provide real IFM data if there is a lack of real IFM data for them to provide. Similarly, the weight generators may provide weights if they have weights, or may not provide real weights if there is a lack of real weights for them to provide.

CEs 0 to 7 each comprise at least one MAC element. The total number of MAC elements in the array of MAC elements 220 may be 4096, and the array of MAC elements 220 may be evenly divided into CEs, such that each CE comprises 512 MAC elements.

An IFM is divided into IFM blocks 0 to 9. Each IFM block comprises a set of IFM data values. In the present example, each IFM block is obtained by the IFM generators and provided synchronously to each CE. IFM block 0 is obtained and provided first. In this example, IFM block 0 is loaded into each CE in a first clock cycle of the NPU 200. During the first clock cycle each CE may multiply at least one IFM data value by at least one weight during the first clock cycle and transfer the result of its multiplication to its associated accumulator buffer, as described with reference to FIG. 2.

Loading IFM block 0 into each CE typically comprises toggling at least some of the bits of each CE. This may consume power. In addition, loading the weights into the CEs, performing the multiplication, performing number format conversions, and transferring the result to an accumulator buffer also may consume power. It should be noted that toggling the bits of each CE may be a major contributor to the amount of power consumed during a given clock cycle of the processing unit. The amount of toggling required may depend on the magnitude of the IFM data.

Prior to the loading of IFM block 0 into each CE, the CEs may have been in an idle state, where no IFM data is being loaded into any of the CEs. In such a case, the loading of IFM block 0 into each CE means that the voltage across and power consumed by the array of MAC elements 220 of the NPU 200 increases during the first clock cycle. The increase in power consumed by the NPU 200 may be up to 4 W, and this increase may occur over approximately 1 nanosecond. This sudden increase, or power transient, may result in hold, set-up and clock skew violations, which can sometimes cause the NPU to crash.

IFM block 1 is the next IFM block to be obtained by the IFM generators and provided to each of the CEs. IFM block 1 is loaded into each CE in a second clock cycle of the NPU 200 immediately subsequent to the first clock cycle.

Loading IFM block 1 into each CE typically comprises toggling at least some of the bits of each CE. The amount of toggling required may depend on the IFM data in IFM blocks 0 and 1. For example, if a bit of a CE comprises a data value of IFM block 0 in the first clock cycle, and the data value of IFM block 1 to be loaded during the second clock cycle is the same as the data value of IFM block 0 in the first clock cycle, the bit may not need to be toggled. However, if these two data values are different, then the bit may need to be toggled. The amount of power consumed in toggling these bits may be proportional to the number of bits that need to be toggled. The amount of power consumed may depend on the number of sign changes between the data values of IFM block 0 and the data values of IFM block 1.

IFM block 2 is the next IFM block to be obtained by the IFM generators and provided to each of the CEs. IFM block 2 is loaded into each CE in a third clock cycle of the NPU 200 immediately subsequent to the second clock cycle. As mentioned above, the amount of power consumed in toggling the bits of the CEs is proportional to the number of bits that need to be toggled, which depends on the IFM data in IFM blocks 1 and 2. Therefore, the amount of power consumed in toggling the bits during the second clock cycle may be different from the amount of power consumed in toggling the bits during the third clock cycle.

The loading of IFM blocks 3 to 5 into the CEs is performed in successive clock cycles of the NPU 200 subsequent to the second clock cycle, similar to the manner described above.

After IFM block 5 is loaded into each of the CEs, there is a lack of data to be loaded into the CEs. This may result from the IFM generators 210 or the weight generators 230 being unable to provide the IFM data at the same speed at which the IFM data is processed by the CEs. In any case, there is a lack of IFM data to be processed in a seventh clock cycle of the NPU 200.

As a result, during the seventh clock cycle, each of the CEs becomes idle. No IFM data is loaded into the CEs, and the CEs do not perform any multiplication of any IFM data with any weights. The bits of the CEs are not toggled to load new IFM data into the CEs.

In turn, the power consumed by the NPU 200 decreases substantially. In a similar fashion to the sudden increase in power caused by the loading of IFM block 0 into each CE, the sudden decrease in power consumed may result in hold, set-up and clock skew violations, which can sometimes cause the NPU to crash. This lack of IFM data to be processed lasts for one clock cycle. IFM blocks 6 and 7 are loaded into each CE in the eighth and ninth clock cycles of the NPU 200 respectively. This is followed by a second lack of IFM data which lasts for the tenth and eleventh clock cycles of the NPU 200.

In the twelfth and thirteenth clock cycles of the NPU 200, IFM blocks 8 and 9 respectively are loaded into each CE. This completes the loading of the IFM into the CEs. From the fourteenth clock cycle of the NPU 200 onwards, no IFM data or weights are loaded into the CEs. As a result, each of the CEs becomes idle. In turn, the power consumed by the NPU decreases substantially.

As mentioned previously, sudden decreases and increases in power consumed by the array of MAC elements 220 may result in hold, set-up and clock skew violations. It is therefore desirable to provide a method for computing an output feature map which has less steep or smaller decreases and increases in power, while maintaining synchronicity between the CEs, to avoid processing of different sets of input data by different CEs during the same processing cycle. Examples of such a method will be described with reference to FIGS. 4, 5 and 6.

Figure 4:
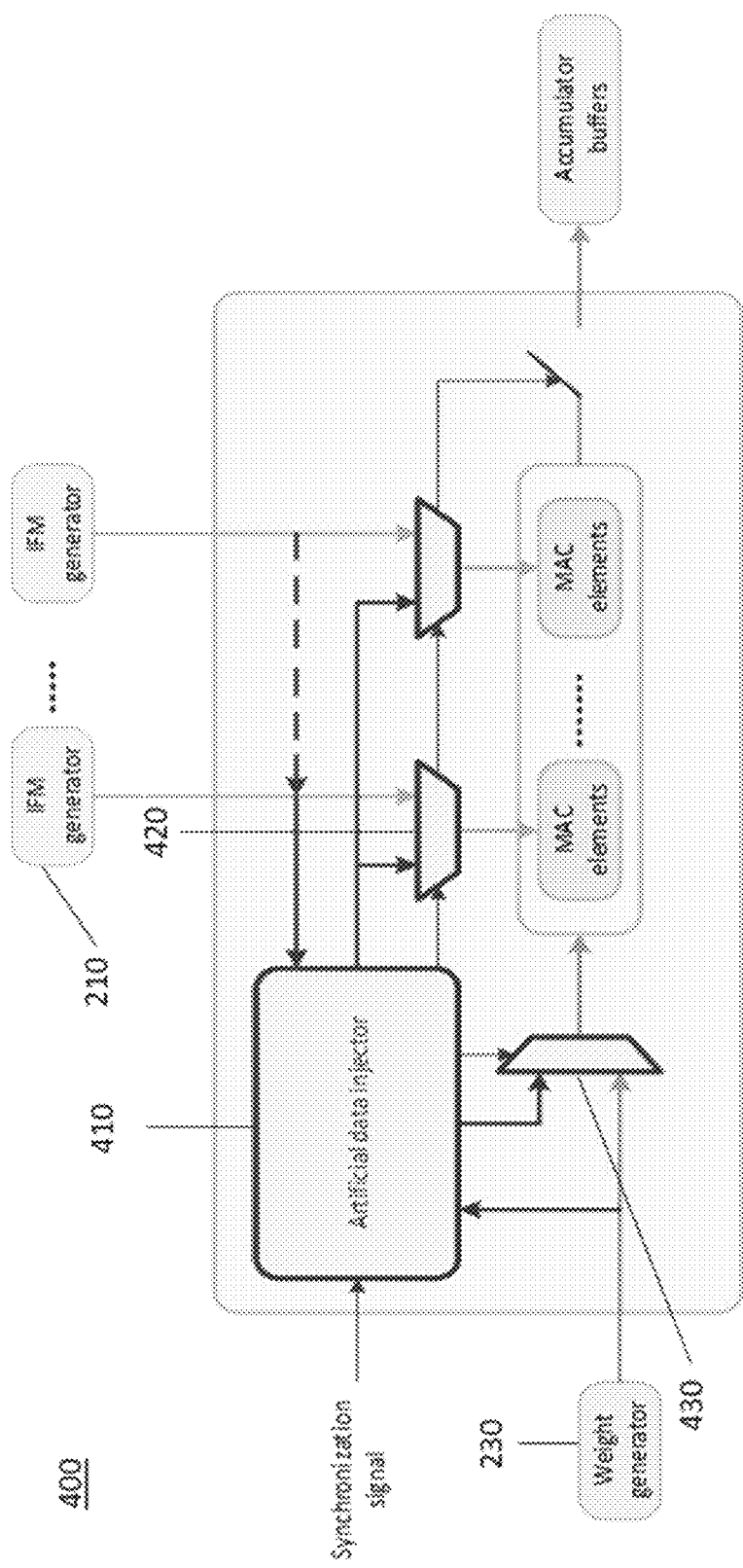
FIG. 4 is a schematic diagram of a neural processing unit according to examples.

FIG. 4 is a schematic diagram of a neural processing unit (NPU) 400 according to examples. The NPU 400 may be configured to process IFM data according to the timing diagrams of FIG. 5b or FIG. 6b. In order to mitigate a power transient, an artificial data injector 410 may be provided, and/or an IFM buffer 420 for each MAC element and/or a weight buffer 430 for each CE may be provided.

The NPU 400 may comprise IFM generators, an array of MAC elements 220, and/or weight generators, arranged to perform at least some of the operations described with reference to FIG. 2.

The IFM generators such as IFM generator 210 may provide real IFM data to IFM buffers such as IFM buffer 420. The IFM buffers may be configured to store IFM blocks. A MAC element may load IFM data from an IFM buffer associated with that MAC element. In this example, there is one IFM buffer associated with each MAC element. In FIG. 4, each IFM buffer 420 is configured to store a single set of (real) IFM data (such as a single IFM block), as the NPU 400 is configured to process solely one set of real data at a time, e.g. during a given processing cycle. By processing a single set of real IFM data at a time in this manner, the IFM buffer 420 need not have capacity to store a plurality of sets of IFM blocks, allowing a smaller IFM buffer 420 to be used.

While only one CE is shown, it is to be understood that the NPU comprises a plurality of CEs, for example 8 CEs. Each MAC element of each CE may be associated with an IFM buffer.

In addition to providing real IFM data to IFM buffers, the IFM generators may also provide real IFM data to the artificial data injector 410. The artificial data injector 410 may derive artificial IFM data from the real IFM data. Additionally, or alternatively, artificial IFM data may be pre-programmed into the artificial data injector 410.

In general, real data refers to data input to the NPU 400 for processing during normal operation. Real data is used to generate computational results, and output feature map data is generated based at least in part on such computational results. Put another way, real data refers to data that, when processed, contributes to the output feature map generated by the computation resources.

In contrast, artificial data refers to data which may be derived from real data by or pre-programmed into the artificial data injector 410, and which may be loaded into at least one of the CEs during clock cycles where no or less data would otherwise be processed by the at least one of the CEs or where different input data would otherwise be processed by the at least one of the CEs. For example, a set of real data can be loaded into a subset of available CEs and the artificial data can be loaded into a remainder of the available CEs during at least one clock cycle rather than utilising the remainder of the available CEs to process a different set of real data, thereby maintaining synchronicity between the available CEs during the at least one clock cycle.

Furthermore, due to processing of the artificial data, more power is consumed by the computation resources. This in turn reduces the amount of change in power consumption or current drawn by the processing unit between clock cycles in which real data is processed and clock cycles in which a combination of real data and artificial data is processed, and in turn, a risk of hold, set-up and clock skew violations may be reduced. The artificial data is inhibited from affecting the OFM.

The artificial data injector 410 may store one real IFM block at a time, such as one of IFM blocks 0 to 9 described with reference to FIG. 3b. The IFM block may be provided to the artificial data injector 410 by the IFM generators.

The weight generators such as weight generator 230 may provide weights to weight buffers such as weight buffer 430. The weight buffers may be configured to store weights. In FIG. 4, each weight buffer 430 is configured to store a single set of (real) weight data, as the NPU 400 is configured to process solely one set of real data at a time, e.g. during a given processing cycle. By processing a single set of real weight data at a time in this manner, each weight buffer 430 need not have capacity to store a plurality of sets of weight data, allowing smaller weight buffers 430 to be used.

While only one weight buffer 430 is shown in FIG. 4, it is to be understood that there may be one weight buffer associated with each CE. In addition to providing weights to the weight buffers, the weight generators may also provide weights to the artificial data injector 410. The artificial data injector 410 may derive artificial weights from the weights. Additionally, or alternatively, artificial weights may be pre-programmed into the artificial data injector 410.

The artificial data injector 410 may receive a synchronization signal. The synchronization signal may indicate the availability of real IFM data or real weights to be provided to the CEs 5-7 clock cycles in advance. For example, in the sixth clock cycle in the example of FIG. 3b, IFM block 5 is being loaded into the CEs, while in the seventh clock cycle, no IFM data is being loaded into the CEs. In the method of FIG. 4, this lack of data to be loaded into the CEs during the seventh clock cycle may be detected 5-7 clock cycles earlier. This may be described as a falling edge on the synchronization signal.

In general, detecting a lack of real data for processing in a given processing cycle (e.g. clock cycle) refers to detecting that there will be a lack of real data to be loaded into at least one CE during a given processing cycle later than the current processing cycle, wherein during the current processing cycle the lack is detected. This means that at least one CE may be idle or under-utilised during the given processing cycle if no data is loaded into and/or processed by said at least one CE during the given processing cycle. The at least one CE may be idle if there is no real IFM data or real weights to be loaded during the given processing cycle. Alternatively, the at least one CE may be under-utilised if there is a shortage of real data to be loaded during the given processing cycle. The at least one CE may alternatively be under-utilised if the content of the real data to be loaded during the given processing cycle and the content of the data to be loaded during the processing cycle directly preceding the given processing cycle are such that the power consumed by the CE during the given processing cycle is different from the power consumed by the CE during the processing cycle directly preceding the given processing cycle.

Nevertheless, during the current processing cycle during which the lack is detected, real data may be loaded into and processed by the at least one CE.

The presence of IFM block 6 to be loaded into the CEs during the eighth clock cycle, subsequent to the lack of data to be loaded into the CEs during the seventh clock cycle, may be detected 5-7 clock cycles earlier. This may be described as a rising edge on the synchronization signal.

The artificial data injector 410 (or another component of the NPU 400) may take action upon detecting a falling edge or rising edge on the synchronization signal. When the artificial data injector 410 or the other component of the NPU 400 detects a falling edge or rising edge on the synchronization signal, it may trigger a ramp-down or a ramp-up, in which the number of CEs activated for use in processing IFM data and weights is ramped down or ramped up. For example, ramping down the number of CEs involves deactivating at least one CE that was available in a previous processing cycle, to decrease the number of activated CEs. In contrast, ramping up the number of CEs involves activating at least one CE that was deactivated in a previous processing cycle, to increase the number of activated CEs. A CE that is activated is for example a CE that is used for loading and/or processing of data (which may be real data or artificial data) during a given processing cycle, whereas a deactivated CE is for example a CE that is idle or inactive, and that is not used during a given processing cycle. An activated CE may be referred to as an available CE.

Depending on the number of CEs available during a given processing cycle (e.g. the number of activated CEs), the artificial data injector 410 may obtain artificial data, such as artificial IFM data and/or artificial weight data. In examples, a first subset of the available CEs is used for processing real data during the processing cycle and the artificial data is loaded into the second subset of the available CEs during the processing cycle (and in some cases, the artificial data is processed by the second subset of the available CEs). The first and second subset of the available CEs are determined based on the number of CEs available during the processing cycle, for example as described further below.

In these examples, the artificial data injector 410 may provide artificial IFM data to at least a subset of the IFM buffers. The second subset of the CEs may load the artificial IFM data from the IFM buffers. Similarly, the artificial data injector 410 may provide the artificial weight data to at least a subset of the weight buffers. The second subset of CEs may load the artificial weights from the weight buffers. The first subset of the CEs may load real IFM data from the IFM buffers and real weight data from the weight buffers. The real IFM data may be stored in a different subset of the IFM buffers than the artificial IFM data. Similarly, the real weight data may be stored in a different subset of the weight buffers than the artificial weight data. In other examples, though, the artificial IFM data may be derived from the real IFM data stored in the IFM buffer(s) and/or the artificial weight data may be derived from the real weight data stored in the weight buffer(s) so that there is no need to separately store artificial IFM and/or weight data in the IFM buffer(s) or the weight buffer(s), respectively.

Each MAC element of the first subset of the CEs may multiply at least one real weight by at least one real IFM data value to generate at least part of a real computational result, which may be transferred to the accumulator buffers and used in generating OFM data. Similarly, each MAC element of the second subset of the CEs may multiply at least one artificial weight by at least one artificial IFM data value to generate at least part of an artificial computational result. The artificial computational result may be discarded. The artificial computational result may not be transferred to the accumulator buffers.

Figure 5A:
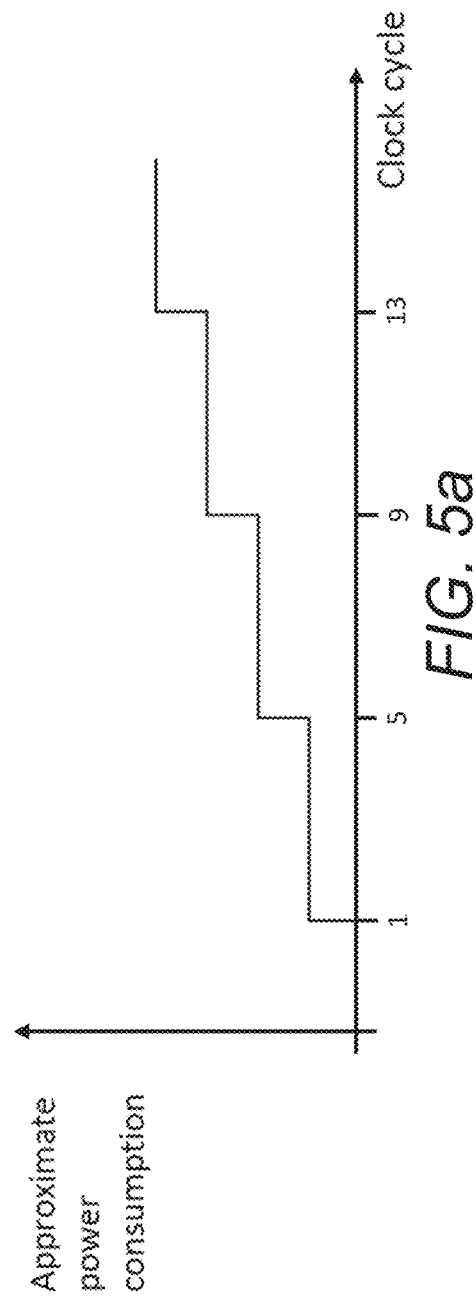
FIG. 5a shows a timeline for approximate power consumption of a neural processing unit according to examples.
Figure 5B:
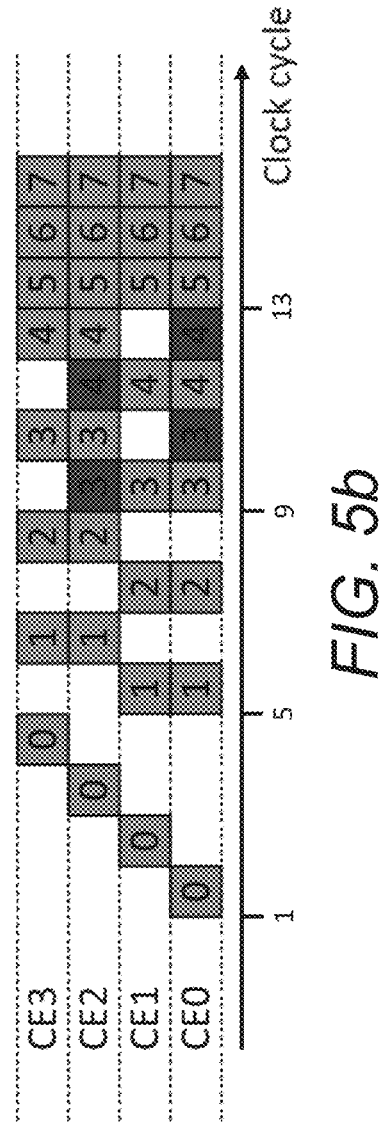
FIG. 5b shows a timing diagram for processing of IFM data according to examples.

FIG. 5a shows a timeline for approximate power consumption of a neural processing unit according to examples. FIG. 5b shows a timing diagram for processing of IFM data according to examples. The timeline of FIG. 5a pertains to the NPU 400 for which the timing of the processing of IFM data is shown in FIG. 5b.

Prior to IFM block 0, the CEs of FIG. 5b may not process any IFM data and may be in an idle state (which may be considered to be a deactivated or unavailable state). The artificial data injector 410 may detect a rising edge on a synchronization signal indicating the availability of IFM blocks 0 to 7. This may trigger a ramp-up process.

The IFM generators may synchronously provide (real) IFM block 0 to the IFM buffers. In FIG. 5b, there are 4 CEs (labelled CE0 to CE3), which each load IFM block 0 from their respective IFM buffers at different times (in this case, during different processing cycles). This process may be referred to as "staggering". During clock cycle 1, IFM block 0 is loaded into CE0 and processed, which in this example involves multiplying the IFM data values of IFM block 0 with corresponding weights of a first set of weights for IFM block 0 and, in some cases, transferring the result of the multiplication to an accumulator buffer. During clock cycle 1, the remaining CEs 1 to 3 may be in the idle state. It is to be understood that, in this example, during a clock cycle in which a CE is not loading real data or artificial data, it is in the idle state and is considered unavailable. In clock cycle 2, CE1 loads and processes IFM block 0 (by multiplying the IFM data values of IFM block 0 with corresponding weights of a second set of weights for IFM block 0). CEs 0, 2 and 3 are idle during clock cycle 2. In clock cycle 3, CE2 loads and processes IFM block 0 (by multiplying the IFM data values of IFM block 0 with corresponding weights of a third set of weights for IFM block 0). CEs 0, 1 and 3 are idle during clock cycle 3. In clock cycle 4, CE3 loads and processes IFM block 0 (by multiplying the IFM data values of IFM block 0 with corresponding weights of a fourth set of weights for IFM block 0). CEs 0, 1 and 2 are idle during clock cycle 4.

In the first to fourth clock cycles, the number of CEs available per clock cycle is one, with different CEs being available, and used to process different sets of weights with the same IFM block, in different clock cycles. As the ramp-up has been triggered in response to detecting a rising edge on the synchronization signal, the number of CEs available per clock cycle is increased in the fifth to eighth clock cycles. In this example, two CEs are available per clock cycle during the fifth to eighth clock cycles.

In the present example, which is a simplified example, the (real, first) data to be processed comprises 8 IFM blocks, each of which are to be processed with each of four sets of weight data per IFM block. Each IFM block is processed with each of the four sets of weight data before processing the subsequent IFM block with each of a different four sets of weight data, and so on until each of the 8 IFM blocks have been processed. Each CE is associated with a different set of weight data, so that each CE is used to process a different respective set of weight data with a given IFM block. The set of weight data used by each CE differs between successive IFM blocks. In other words, CE0 uses different sets of weight data to process the first IFM and the second IFM block and similarly for CE1 to CE3. The sets of weight data used by CE0 are also different from those used by CE1 to CE3. In this case, for a particular IFM block, CE0 to CE3 are used to multiply weights of first to fourth sets of weight data, respectively, with corresponding elements of the particular IFM block to be processed, and the first to fourth sets of weight data used for processing a given IFM block differs from that used for processing a previous and subsequent IFM block. Each combination of an IFM block and a set of weights may be considered to correspond to a set of real data to be processed (which may be, for example, first, real, data). Each set of weights may be considered to correspond to a respective input data element, with the set of real data comprising m input data elements in total (where, in this example, m is equal to four as there are four sets of weights). Thus, processing of the IFM block and each of the sets of weights may be considered to generate m output data elements, each corresponding to a different one of the sets of weights.

In this example, CE0 and CE1 load and process IFM block 1 with first and second sets of weights for IFM block 1 (which differ from the first and second sets of weights for IFM block 0), respectively, in clock cycle five. CE0 and CE1 may thus be considered to be available in clock cycle five, with CE2 and CE3 remaining idle. Then, in clock cycle six, CE2 and CE3 load and process IFM block 1 with the third and fourth sets of weights for IFM block 1 (which differ from the third and fourth sets of weights for IFM block 0), respectively. CE2 and CE3 may thus be considered to be available in clock cycle five, with CE0 and CE1 remaining idle.

Similarly, CE0 and CE1 load and process IFM block 2 with the first and second sets of weights for IFM block 2 (which differ from the first and second sets of weights for IFM block 1), respectively, in clock cycle seven. CE0 and CE1 may thus be considered to be available in clock cycle seven, with CE2 and CE3 remaining idle. Then, in clock cycle eight, CE2 and CE3 load and process IFM block 1 with the third and fourth sets of weights for IFM block 2 (which differ from the third and fourth sets of weights for IFM block 1), respectively. CE2 and CE3 may thus be considered to be available in clock cycle eight, with CE0 and CE1 remaining idle.

The ramp-up process continues in clock cycles nine to twelve. In clock cycles zero to four, one CE was available per clock cycle, in clock cycles five to eight, two CEs were available per clock cycle and in clock cycles nine to twelve, three CEs are available per clock cycle. As explained above, this example involves obtaining m output data elements per set of real data to be processed (i.e. per IFM block to be processed with each of four sets of weight data), where m is equal to four. However, as the number of output data elements per set of real data to be processed is indivisible by the number of CEs available per clock cycle without leaving a remainder, it is not possible to allocate the set of real data to the available CEs without leaving some available CEs without data of the set of the real data to process. For example, CE0 to CE2 could be used to load and process IFM block 3 with the first to third sets of weight data for the IFM block 3 in clock cycle nine (utilising three available CEs) and CE3 could be used to load and process IFM block 3 with the fourth set of weight data for the IFM block 3 in clock cycle ten. However, this would mean that, in clock cycle ten, the remaining two of the three available CEs could either not be utilised, causing a sudden decrease in power consumption compared to clock cycle nine, or the remaining two of the three available CEs in clock cycle ten could instead be used to load and process IFM block 4 with an associated set of weight data. With the latter approach, this would involve processing two different IFM blocks during the same clock cycle (clock cycle ten), which would complicate the design of the NPU 400 and may involve adding extra storage to the NPU 400 to hold additional IFM blocks to be processed at the same time as each other.

To avoid this, the approach of FIG. 5*b* instead involves, in clock cycle nine, processing a first portion of a set of real data (which set of real data comprises the IFM block 3 and first to fourth sets of weight data for IFM block 3, which differs from the first to fourth sets of weight data for IFM block 3) with a first subset of the CEs, and loading second, artificial, data into a second subset of the CEs. A determination to process the first portion of the set of real data with a first subset of the CEs and to load the second data into a second subset of the CEs is made based on a number of computation resources (in this case, a number of CEs) available for use during a processing cycle (in this case, during a clock cycle). For example, this determination may be made based on identifying that the number of output data elements per set of real data is indivisible by the number of available computation resources during a processing cycle without leaving a remainder. In some cases, though, it may be determined or otherwise identified that the number of output data elements per set of real data is a power of two. In these cases, this determination to process the first portion of the set of real data with a first subset of the CEs and to load the second data into a second subset of the CEs may be performed straightforwardly by determining that the number of available computation resources during a processing cycle is a non-power-of-two.

In the example of FIG. 5b, there are three CEs available in clock cycle nine and there are four output data elements to be obtained for the set of real data (corresponding to a multiplication of the IFM block 3 with the first to fourth sets of weight data for IFM block 3, respectively). Hence, this determination may be performed straightforwardly in FIG. 5b by determining that there are three available CEs in clock cycle nine and that three is not a power of two.

This determination may be performed by any suitable component of or accessible to the NPU 400. For example, this determination may be performed by a controller of the NPU 400 (not shown in FIG. 4). Such a controller may be communicably coupled to at least the IFM generators 120 and the weight generator 230 of the NPU 400.

In the case of FIG. 5b, the first portion of the set of real data comprises the IFM block 3 and the first and second sets of weight data for IFM block 3. CE0 and CE1 load and multiply the IFM block 3 with the first and second sets of weight data for IFM block 3, respectively, and are thus available in clock cycle nine. CE0 and CE1 may thus be considered to correspond to the first subset of the CEs.

In this example, CE2 is also available in clock cycle nine, and may be considered to correspond to the second subset of the CEs. Artificial data (which may be referred to as second, artificial, data) is generated by the artificial data injector 410, for loading using CE2. CE2 may be considered to be an artificially activated subset of the CEs in that CE2 is used to load artificial data rather than real data. The artificial data includes at least one artificial data element. Typically, the artificial data injector 410 generates artificial IFM data and artificial weights.

The artificial IFM data may be derived from real IFM data, such as the IFM data of any of IFM blocks 0 to 7. The artificial data injector 410 provides artificial IFM block 3 to the IFM buffer associated with CE2. In this example, the artificial IFM block 3 is derived from IFM block 3. Artificial IFM block 3 may comprise the same data as IFM block 3 but in a different order. For example, the IFM block 3 may comprise an array of real data elements (e.g. stored as an array or a vector) and deriving the artificial IFM block 3 from the IFM block 3 may involve changing the order of the real data elements within the array. As an example, if the IFM block 3 at time j includes 8 real data elements, and is representable as IFM3[j][0, 1, 2, 3, 4, 5, 6, 7], the order of the real data elements in the array may be altered to generate artificial IFM block 3 (AIFM3), representable as AIFM3[j][1, 0, 3, 2, 5, 4, 7, 6]. In this example, for each pair of elements of the array, the order of the elements with the pair is swapped to generate the artificial data. However, in other examples, the order of the real data elements within the array may be changed in a different manner.

The artificial data injector 410 also provides artificial weights to the weight buffer associated with CE2. The artificial weights may be derived from weights previously used in processing IFM blocks 0 to 2. Similarly to the real weights, the artificial weights provided to weight buffers associated with different CEs may be different. The artificial weights provided to a given buffer may be the same as the weights that were provided to that buffer to process a preceding IFM block (i.e. IFM block 1 in this example, for clock cycle nine). For example, the buffer associated with CE2 may be provided with the third set of weights for IFM block 1 as artificial weights, rather than being provided with real weights corresponding to the third set of weights for IFM block 3. In this way, the CE2 is provided with the third set of weights for IFM block 1 in clock cycle 6 as real data, the third set of weights for IFM block 2 in clock cycle 8 as real data, the third set of weights for IFM block 1 in clock cycle 9 as artificial data, and the third set of weights for IFM block 3 in clock cycle 10 as real data (discussed below).

In clock cycle nine, CE2 loads the artificial IFM block 3 from the IFM buffer associated with CE2. Loading the artificial IFM data may consume power, as compared with being in the idle state.

As described with reference to FIG. 3b, loading an artificial IFM block typically comprises toggling bits in the MAC elements of the CEs. In order to load artificial IFM block 3 into CE2 when IFM block 2 was the previously loaded block in CE2, the bits representing data values that are different between artificial IFM block 3 and IFM block 2 may be toggled. As explained above, the artificial IFM block 3 is derived from the real IFM block 3. This means that the power consumed in toggling bits for CE2 in clock cycle nine may be similar to the power that would be consumed in loading the real IFM block 3.

CE2 also loads the artificial weights from the weight buffer associated with CE2, which may similarly involve toggling bits representing data values that are different between the artificial weights loaded into CE2 in clock cycle nine and the real weights that were loaded into CE2 in clock cycle eight, which may consume power similar to the power that would be consumed in loading real weights.

CE2 may multiply the artificial IFM block 3 with the artificial weights to generate an artificial computational result. Processing of the artificial IFM block 3 with the artificial weights may consume power, so that the power consumed by CE2 during clock cycle nine is similar to the power that would be consumed by CE2 if CE2 were to instead process real IFM block 3 with the third set of (real) weight data.

The artificial data is inhibited from affecting the OFM. For example, CE2 may load the artificial data, but it may not process the artificial data. Alternatively, if CE2 processes the artificial data, it may discard the generated artificial computational result, and/or not transfer the artificial computational result to the accumulator buffers.

In clock cycle ten, a different first subset of the CEs is used to process a second portion of the set of real data. The second portion of the set of real data comprises the IFM block 3 and the third and fourth sets of weight data for IFM block 3. CE2 and CE3 load and multiply the IFM block 3 with the third and fourth sets of weight data for IFM block 3, respectively, and are thus available in clock cycle ten. CE2 and CE3 may thus be considered to correspond to the different first subset of the CEs. The first subset of the CEs used to process the first portion of the set of real data in clock cycle nine (CE0 and CE1) may be considered to correspond to a first activated subset of activated CEs and the different first subset of the CEs used to process the second portion of the set of real data in clock cycle ten (CE2 and CE3) may be considered to correspond to a second activated subset of activated CEs.

In this example, CE0 is also available in clock cycle ten, and may be considered to correspond to a different second subset of the CEs, for loading artificial data. The artificial data loaded into CE0 in clock cycle ten includes the artificial IFM block 3 (which is derived from the real IFM block 3 in a similar manner as described with reference to clock cycle 9) and artificial weights that correspond to the real weights that were processed by CE0 in a preceding clock cycle (clock cycle 7). It is to be appreciated that a preceding clock cycle need not be an immediately preceding clock cycle and may instead be a clock cycle that is prior to a given clock cycle with at least one intervening clock cycle in between the preceding clock cycle and the given clock cycle. The artificial IFM data and the artificial weight data are provided to the IFM buffer and the weight buffer associated with CE0, respectively, by the artificial data injector 410, and are loaded from the IFM buffer and weight buffer by CE0 in clock cycle nine. CE0 may also process the artificial data. Whether the artificial data is processed or not, the artificial data is inhibited from affecting the OFM.

In FIG. 5b, there is thus a first deactivated subset of deactived CEs (corresponding to CE3) in clock cycle nine and a second deactivated subset of deactivated CEs (corresponding to CE1) in clock cycle ten. There is also a first artificially activated subset of activated CEs (corresponding to CE2) in clock cycle nine and a second artificially activated subset of activated CEs (corresponding to CE0) in clock cycle ten, each for processing artificial data.

In FIG. 5b, the same number of CEs (two) is used to process real data in clock cycles 9 and 10. However, different CEs are used in each of clock cycles 9 and 10 to process the real data. Similarly, the same number of CEs (one) is used to process artificial data in clock cycles 9 and 10. Different CEs are used in each of clock cycles 9 and 10 to process the artificial data. In this way, the set of real data is divided evenly between the CEs across the processing cycles over which the set of real data is processed, which may reduce fluctuations in power consumption between different processing cycles.

In other examples, though, a different number of CEs may be used to process real data in different clock cycles. For example, with reference to FIG. 5b, CE0 to CE2 could be used to process the IFM block 3 with the first to third weight data for IFM block 3 in clock cycle nine and CE3 could be used to process the IFM block 3 with the fourth weight data for IFM block 3 in clock cycle ten, with two of CE0 to CE2 used to process artificial data in clock cycle ten (as the number of CEs available in clock cycles 9 and 10 is three per clock cycle).

In general, where a set of real data to be processed over c processing cycles (e.g. over 2 processing cycles in FIG. 5b), includes m input data elements to obtain m output data elements (e.g. 4 output data elements in FIG. 5b), and n computation resources are available (e.g. 3 CEs in FIG. 5b), n*c computation resources may be considered to be available over the c processing cycles (i.e. 6 CEs available over the 2 processing cycles in FIG. 5b). In these examples, it may be determined to use m computation resources over the c processing cycles (i.e. 4 CEs out of the 6 CEs available over the 2 processing cycles in FIG. 5b), each for processing a different one of the m input data elements. This leaves a remainder of (n*c−m) computation resources (e.g. 2 CEs in FIG. 5b) for processing the artificial data, for example to avoid moving on to processing of a subsequent set of real data during the c processing cycles. In examples such as this, the number of computation resources available per processing cycle is constrained to be n. However, the same or a different number of computation resources may be used to process real data in each of the processing cycles provided that m different computation resources are used to process each of the m different input data elements. Similarly, the same or a different number of computation resources may be used to process artificial data in each of the processing cycles provided that (n*c−m) computation resources are used for processing the artificial data in total over the c processing cycles. This approach allows synchronicity to be maintained, so that the only real data processed during the c processing cycles belongs to the same set of real data, avoiding the need for the NPU 400 to store multiple sets of different real data for processing during a single processing cycle.

The processing of clock cycles eleven and twelve of FIG. 5b is the same as that performed in clock cycles nine and ten except that IFM block 4 is processed instead of IFM block 3 and artificial IFM block 4 is loaded instead of artificial IFM block 3. Artificial IFM block 4 is derived from IFM block 4 in the same way as artificial IFM block 3 is derived from IFM block 3. Hence, in clock cycle eleven, CE0 and CE1 process IFM block 4 with the first and second sets of weights for IFM block 4, respectively, and CE2 loads artificial IFM block 4 and artificial weights (corresponding to the third set of weights for IFM block 2). In clock cycle twelve, CE2 and CE3 process IFM block 4 with the third and fourth sets of weights for IFM block 4, respectively, and CE0 loads artificial IFM block 4 and artificial weights (corresponding to the first set of weights for IFM block 3).

This completes the ramp-up process of FIG. 5b. The number of CEs loading and/or processing real or artificial data (also referred to as activated CEs) increases gradually over the clock cycles corresponding to the ramp-up process (clock cycles 1 to 12), and the number of CEs in the idle state (also referred to as deactivated CEs) decreases gradually over these clock cycles. The timeline for approximate power consumption of FIG. 5a indicates schematically the number of active CEs during these clock cycles of FIG. 5b. By gradually raising the number of active CEs, compared with activating all CEs in one clock cycle, the amount of power consumed by the array of MAC elements 220 may change by a smaller amount per clock cycle, and furthermore, the average time derivative of the power consumed between the start and end of the artificial initial ramp-up may be reduced. These effects may reduce the risk of hold, set-up and clock skew violations, and hence the risk of the NPU 400 crashing.

In FIG. 5b, each stage of the ramp-up involves a predefined number of clock cycles (four in this case). The number of available CEs is increased by one after each stage of the ramp-up is completed. In other examples, though, the number of clock cycles per stage of a ramp-up process may differ from four and/or may vary over time. For example, in FIG. 6b (discussed further below), each stage of the ramp-up involves eight clock cycles. In general, the number of clock cycles per stage of a ramp-up (or ramp-down) process may equal the total number of CEs of an NPU (which, in turn, may equal the number of input data elements of a set of input data to be processed).

In FIG. 5b, a CE may be deactivated after it has been activated during the ramp-up process. For example, CE0 may be activated for one clock cycle (clock cycle one) when it loads and processes IFM block 0, and may be deactivated for three subsequent clock cycles (clock cycles two to four) before loading and processing IFM block 1. By deactivating CE0, some of the other CEs can load and process IFM block 0 before CE0 loads and processes IFM block 1. Compared with activating 1 CE at a time and not deactivating any CEs during the initial artificial ramp-up, this method may allow the sizes of the IFM buffers to be reduced while still enabling synchronous provision of IFM blocks.

While there is no rising or falling edge on the synchronization signal, i.e. while the provision of IFM blocks by the IFM generators is continuous, the CEs may continue to load and process IFM blocks in the order in which they are provided. In this example, the maximum number of available computation resources corresponds to the number of output data elements for a given set of input (real) data to be processed, which is four in FIG. 5b. Hence, an entire set of output data elements can be generated by synchronous processing of a given IFM block with a respective input data element (e.g. a respective set of weights) by a respective CE of the available CEs, without losing synchronicity. In this example, CEs 0 to 3 thus load and process IFM block 5 with the first to fourth set of weights for IFM block 5, respectively, in clock cycle thirteen. CEs 0 to 3 load and process IFM block 6 with the first to fourth set of weights for IFM block 6, respectively, in clock cycle fourteen. CEs 0 to 3 load and process IFM block 7 with the first to fourth set of weights for IFM block 7, respectively, in clock cycle fifteen.

Although not shown in FIG. 5b, it is to be appreciated that the artificial data injector 410 may detect a falling edge on the synchronization signal. This may represent a lack of IFM data. Additionally, or alternatively, it may represent a lack of weights. This may trigger a ramp-down process. The number of computation resources available may be reduced gradually across a plurality of processing cycles of the ramp-down in the reverse manner to that in which the number of available computation resources is gradually increased in the ramp-up shown in FIG. 5b. The ramp-down may, similarly to a ramp-up, involve processing at least a portion of first, real, data using a first subset of available computation resources and loading second, artificial, data using a second subset of the available computation resources, disjoint from the first subset. Determining to perform the processing and loading of the real and artificial data in this manner may similarly be performed based on the number of available computation resources. The ramp-down process may be completed when the number of activated CEs is zero and/or when more real data is received.

While not depicted in FIG. 5b, the clock cycle duration of the processing unit may be varied. For example, the clock cycle duration during a ramping process, such as a ramp-down or a ramp-up, may be longer than the clock cycle duration when no ramp-down or ramp-up is in progress.

By lengthening the clock cycle duration during a ramp-up or a ramp-down, the average time derivative of the power consumed between the start and end of the ramp-up or the ramp-down may be reduced. By shortening the clock cycle duration outside of these times, the performance (e.g. the speed with which IFM data is processed) of the NPU 400 may be improved.

FIG. 6a shows a timeline for approximate power consumption of a neural processing unit according to further examples. FIG. 6b shows a timing diagram for processing of IFM data according to further examples. The timeline of FIG. 6a pertains to the NPU 400 for which the timing of the processing of IFM data is shown in FIG. 6b.

FIGS. 6a and 6b are very similar to FIGS. 5a and 5b, respectively, but for an NPU 400 comprising eight CEs (labelled CE0 to CE7) rather than four CEs and for the processing of 24 IFM blocks of an IFM (labelled 0 to 23 in FIG. 6b) rather than 8 IFM blocks. A corresponding description to that of FIGS. 5a and 5b is to be taken to apply to FIGS. 6a and 6b.

FIG. 6b shows another example of a ramp-up process. In FIG. 6b, a set of real data includes an IFM block and first to eighth sets of weights for each IFM block, with each set of weights for a given IFM block to be processed using a different CE, respectively. In clock cycles one to eight, CEs 0 to 7 load and process, in turn, IFM block 0 with first to eighth sets of weights for IFM block 0, respectively. In other words, in clock cycles one to eight, solely a single CE is available per clock cycle, with the other CEs maintained in an idle state (which is for example an inactive or unavailable state). The CEs are made available in order from CE0 to CE7 over clock cycles one to eight, respectively.

In clock cycles nine to sixteen, two CEs are available per clock cycle, with the other CEs maintained in an idle state. The two CEs per clock cycle are made available in order from CE0 to CE7 over clock cycles nine to sixteen. When the final CE (CE7) is made available, the activation of CEs begins again from CE0 and so on. Hence, in clock cycle nine, CE0 and CE1 are available and are used to multiply IFM block 1 with first and second sets of weights for IFM block 1, respectively. CE2 to CE7 are unavailable in clock cycle nine. In clock cycle ten, CE2 and CE3 are available and are used to multiply IFM block 1 with third and fourth sets of weights for IFM block 1, respectively. CE0, CE1 and CE4 to CE7 are unavailable in clock cycle ten. In clock cycle eleven, CE4 and CE5 are available and are used to multiply IFM block 1 with fifth and sixth sets of weights for IFM block 1, respectively. CE0 to CE3, CE6 and CE7 are unavailable in clock cycle eleven. In clock cycle twelve, CE6 and CE7 are available and are used to multiply IFM block 1 with seventh and eighth sets of weights for IFM block 1, respectively. CE0 to CE5 are unavailable in clock cycle twelve.

The same processing is performed in clock cycles thirteen to sixteen as in clock cycles nine to twelve, but with IFM block 2 instead of IFM block 1 processed with the respective sets of weights for IFM block 2.

In clock cycles seventeen to twenty-four, three CEs are available per clock cycle, with the other CEs maintained in an idle state. The three CEs per clock cycle are made available in order from CE0 to CE7 over clock cycles seventeen to twenty-four. When the final CE (CE7) is made available, the activation of CEs begins again from CE0 and so on. For clock cycles seventeen to twenty-four, it is determined that the number of CEs available per clock cycle is a non-power-of-two (three) whereas the set of real data to be processed includes a power of two number of input data elements (eight sets of weights), which are each to be multiplied with an IFM block of the set of real data to generate eight output data elements. It is not possible to divide the number of sets of weights per set of real data by the number of CEs available per clock cycle without leaving a remainder. On this basis, it is determined to use a first subset of the CEs available per clock cycle for processing a portion of the set of real data and a second, disjoint, subset of the CEs available per clock cycle for processing artificial data. The first and second subsets are disjoint for example in that there are no CEs in common between the first and second subsets of CEs. In other words, CE(s) that belong to the first subset do not belong to the second subset and vice versa, for example. The first and second subsets may thus be used to load and/or process data at the same time as each other.

In this example, the first subset of the CEs available per clock cycle is two CEs and the second subset of the CEs available per clock cycle is one CE for clock cycles seventeen to twenty-four. In this example, a set of real data can be processed in four clock cycles. Hence, a first set of real data is processed in clock cycles seventeen to twenty and a second, different set of real data is processed in clock cycles twenty-one to twenty-four.

In total, eight different CEs are used over four clock cycles (clock cycles seventeen to twenty) for processing a given set of real data, and four different CEs are used over these clock cycles for processing artificial data, so that twelve CEs are used in total over the four clock cycles (corresponding to the twelve CEs available over these four clock cycles—with three CEs available for each of the four clock cycles). In this way, synchronicity between the CEs available over each set of four clock cycles is maintained, so that each CE that is available for a given clock cycle either processes a respective portion of the same set of real data or artificial data, without moving on to processing a subsequent set of real data. The artificial data may be derived from the real data as described in more detail above with reference to FIG. 5b.

The real data is processed starting from CE0 and moving up from CE0 towards CE7, with the artificial data processed using the uppermost available CE per clock cycle. The same number of CEs (two) is used for processing the real data in each clock cycle. Similarly, the same number of CEs (one) is used for processing the artificial data in each clock cycle. Hence, in this example, the CEs used for processing the real data move up by two per clock cycle, until a respective portion of the real data has been processed by each of the CEs.

Thus, in clock cycle seventeen, CE0 and CE1 load and process IFM block 3 with the first and second sets of weights for IFM block 3, respectively. CE2 loads artificial data, and may additionally process the artificial data. CEs 3 to 7 are unavailable in clock cycle seventeen. In clock cycle eighteen, CE2 and CE3 load and process IFM block 3 with the third and fourth sets of weights for IFM block 3, respectively. CE4 loads artificial data, and may additionally process the artificial data. CEs 0, 1 and 5 to 7 are unavailable in clock cycle eighteen. In clock cycle nineteen, CE4 and CE5 load and process IFM block 3 with the fifth and sixth sets of weights for IFM block 3, respectively. CE6 loads artificial data, and may additionally process the artificial data. CEs 0 to 3 and 7 are unavailable in clock cycle nineteen. In clock cycle twenty, CE6 and CE7 load and process IFM block 3 with the seventh and eighth sets of weights for IFM block 3, respectively. CE0 loads artificial data, and may additionally process the artificial data. CEs 1 to 5 are unavailable in clock cycle twenty. As explained with reference to FIG. 5b, the artificial data is inhibited from affecting the OFM generated by processing the real data.

The same processing is performed in clock cycles twenty-one to twenty-four as in clock cycles seventeen to twenty, but with IFM block 4 instead of IFM block 3 processed with the respective sets of weights for IFM block 4, and with the artificial input feature map data derived from the IFM block 4 rather than from the IFM block 3.

The ramp-up continues in clock cycles twenty-five to thirty-two, with four CEs available per clock cycle rather than three, with the other CEs maintained in an idle state. As the number of input data elements of a set of real data to be processed (eight) is divisible by the number of CEs available per clock cycle (four) and/or as the number of CEs available per clock cycle is a power of two, it is determined not to use artificial data in clock cycles twenty-five to thirty-two. Hence, in clock cycle twenty-five, CE0 to CE3 are used to process IFM block 5 with the first to fourth sets of weight data for IFM block 5 and CE4 to CE7 are unavailable. Similarly, in clock cycle twenty-six, CE4 to CE7 are used to process IFM block 5 with the fifth to eighth sets of weight data for IFM block 5 and CE0 to CE3 are unavailable. The same processing is performed in clock cycles twenty-seven and twenty-eight, in clock cycles twenty-nine and thirty, and in clock cycles thirty-one and thirty-two but with the IFM blocks 6, 7 and 8 processed, respectively, instead of the IFM block 5.

In clock cycles thirty-three to forty, the ramp-up continues further. In these clock cycles, five CEs are available per clock cycle so it is determined to use four CEs per clock cycle to process a respective portion of a set of real data and one CE per clock cycle to process artificial data. The processing of clock cycles thirty-three to forty is otherwise similar to that of clock cycles seventeen to twenty-four, with the (real) IFM block 9 processed by CE0 to CE3 and by CE4 to CE7 with respective sets of weights for IFM block 9 in clock cycles thirty-three and thirty-four, respectively, the (real) IFM block 10 processed by CE0 to CE3 and by CE4 to CE7 with respective sets of weights for IFM block 10 in clock cycles thirty-five and thirty-six, respectively, the (real) IFM block 11 processed by CE0 to CE3 and by CE4 to CE7 with respective sets of weights for IFM block 11 in clock cycles thirty-seven and thirty-eight, respectively, and the (real) IFM block 12 processed by CE0 to CE3 and by CE4 to CE7 with respective sets of weights for IFM block 12 in clock cycles thirty-nine and forty, respectively. CE4 is used to process artificial input feature map data derived from IFM blocks 9, 10, 11 and 12 in clock cycles thirty-three, thirty-five, thirty-seven and thirty-nine, respectively, and CE0 is used to process artificial input feature map data derived from IFM blocks 9, 10, 11 and 12 in clock cycles thirty-four, thirty-six, thirty-eight and forty, respectively.

The ramp-up process continues in a similar manner in clock cycles forty-one to forty-eight, in which six CEs are available per clock cycle, with the other CEs maintained in an idle state. In clock cycles forty-one to forty-eight, the number of input data elements of a set of real data is eight, which is indivisible by six (the number of available CEs) without leaving a remainder. Hence, in clock cycles forty-one to forty-eight, four of the available CEs are used to process a respective portion of the real data per clock cycle and two of the available CEs are used to process artificial data per clock cycle.

In clock cycles forty-nine to fifty-six, the ramp-up process continues similarly, with seven CEs available per clock cycle, with the other CE maintained in an idle state. In clock cycles forty-nine to fifty-six, the number of input data elements of a set of real data is eight, which is indivisible by seven (the number of available CEs) without leaving a remainder. Hence, in clock cycles forty-nine to fifty-six, four of the available CEs are used to process a respective portion of the real data per clock cycle and three of the available CEs are used to process artificial data per clock cycle.

The ramp-up process ceases at clock cycle fifty-seven. In clock cycles fifty-seven to fifty-nine, all eight CEs are available per clock cycle, meaning that each input data element of a set of real data can be processed by a respective available CE in a single clock cycle. Hence, in clock cycles fifty-seven to fifth-nine, all eight CEs are used to process a respective portion of a set of real data, with a different set of real data (comprising a different IFM block) being processed in each clock cycle.

FIG. 6a shows schematically that the power consumed by the NPU 400 gradually increases over time, as the number of available CEs correspondingly increase over time. As explained with reference to FIG. 5a, by gradually raising the number of active CEs, compared with activating all CEs in one clock cycle, the amount of power consumed by the array of MAC elements 220 may change by a smaller amount per clock cycle, and furthermore, the average time derivative of the power consumed between the start and end of the artificial initial ramp-up may be reduced. These effects may reduce the risk of hold, set-up and clock skew violations, and hence the risk of the NPU 400 crashing.

As explained with reference to FIG. 5b, a ramp-down process (not shown in FIG. 6b) may be performed after the process of FIG. 6b, e.g. if there is a lack of real data to process. During the ramp-down process, the number of available CEs is for example gradually decreased over a plurality of clock cycles. A combination of real data and artificial data may be processed and/or loaded in a given clock cycle of a plurality of ramping processing cycles over which the ramp-down process is performed, so as to gradually decrease the number of available CEs without processing different sets of real data using different CEs within the same clock cycle. The determination of whether to process real data using a first subset of available CEs and to load artificial data using a second, disjoint, subset of available CEs may be made based on the number of available CEs in an analogous manner to the ramp-up process described with reference to FIG. 6b, but for a decreasing number of available CEs rather than for an increasing number of available CEs.

The above examples are to be understood as illustrative examples. Further examples are envisaged. For example, at various clock cycles in FIGS. 5b and 6b it is determined, based on a number of computation resources of a set of available computation resources to process at least a portion of first, real, data using a first subset of the set and to load second, artificial, into a second subset of the set, disjoint from the first subset. In FIGS. 5b and 6b, this determination is performed as part of a ramp-up process in which the number of available computation resources (CEs in FIGS. 5b and 6b) increases over time. However, in other examples, a similar determination may be performed at other times such as during a ramp-down process (described further above) or at times other than during a ramp-up or ramp-down process In these other examples, the determination of whether to use the first and second subsets of the set for the real and artificial data, respectively, may be made based on the number of available CEs for a given processing cycle in a similar manner to the examples above. By loading the artificial data into the second subset of CEs in examples such as this, sudden changes in power consumption may be reduced compared with suddenly commencing or ceasing processing of real data, e.g. if the real data is not received at a high enough rate. This may reduce the risk of hold, set-up and clock skew violations.

For example, if real data is obtained by the NPU more slowly than the CEs are able to process sets of real data, it may be desirable to process a portion of a set of real data using a first subset of CEs and to load artificial data into a second, disjoint, subset of CEs in a given processing cycle (or plurality of processing cycles) so as to slow down the rate at which the set of real data is processed to match or more closely correspond to the rate at which the real data is obtained by the NPU, while maintaining synchronicity between the CEs (i.e. so that each of the CEs is either processing a respective portion of the same set of real data or artificial data). This may in turn reduce complexity by avoiding processing of two different sets of rea data by during the same processing cycle.

In other examples, the size of a job may be such that it is sufficient to use less than all of the available CEs to process real data. This may be the case for jobs that are relatively small. In such examples, a first subset of the available CEs may be used to process first, real, data and a second, disjoint, subset of the available CEs may be used to process second, artificial, data, e.g. to maintain synchronicity between the CEs in a similar manner to that explained above. This approach may be used to utilise the CEs in accordance with a desired utilisation rate, which for example depends on the size of a job to be processed, and which may vary over time (e.g. as jobs of different sizes are received and processed).

It is to be appreciated that, when a ramping process is used, such as a ramp-up or ramp-down process, the number of available computation resources per processing cycle for the ramping processing cycles of the ramping process may be predefined, for example using suitable control logic. Furthermore, if there is a lack of real data to be processed partway through a ramp-up process, the ramp-up process may be ceased partway through as desired, and the number of available computation resources may be maintained at the level reached at the cessation point in the ramp-up process, or a ramp-down process may be initiated, to reduce the number of available computation resources over time. In each of these cases, a determination may be made at a given processing cycle to process at least a portion of real data using a first subset of the available computation resources and to load artificial data into a second, disjoint, subset of the available computation resources, based on the number of available computation resources in the given processing cycle, for example in a similar manner to the examples above.

Instead of gradually raising or reducing the number of activated CEs during a ramp-up or ramp-down, the content of the artificial data provided in successive clock cycles could be adjusted so that the power consumed by the NPU 400 increases or decreases gradually. Furthermore, while in the presently described examples the same IFM data is provided synchronously to the IFM buffers, instead, the same weights may be provided synchronously to the weight buffers.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method for generating output feature map data during operation of neural network processing by a processing unit, the processing unit comprising a plurality of computation resources, the method comprising:
   obtaining first, real, data to be processed;
   determining, based on a number of computation resources of a set of the plurality of computation resources available for use during a processing cycle of the processing unit, to process at least a portion of the first data using a first subset of the set and to load second, artificial, data into a second subset of the set, disjoint from the first subset of the set, the second data comprising at least one artificial data element;
   obtaining the second data;

in the processing cycle:
  loading at least the portion of the first data into the first subset of the set, causing the first subset of the set to generate a computational result; and
  loading the second data into the second subset of the set, the second subset of the set being an artificially activated subset of the set;
inhibiting the second data from affecting the output feature map data; and
generating the output feature map data based at least in part on the computational result.

2. The method of claim 1, wherein the method comprises:
obtaining ramping, real, data;
in a ramping processing cycle of the at least one processing cycle, different from the processing cycle, loading the ramping data into a ramping set of the plurality of computation resources, different from the set of the plurality of computation resources, to generate a ramping computational result; and
generating the output feature map data based at least in part on the ramping computational result.

3. The method of claim 2, wherein:
the ramping processing cycle is before the processing cycle and there are fewer computation resources in the ramping set of the plurality of computation resources than in the set of the plurality of computation resources; or
the ramping processing cycle is before the processing cycle and there are more computation resources in the ramping set of the plurality of computation resources than in the set of the plurality of computation resources.

4. The method of claim 1, wherein the number of computation resources is n, the first data comprises m input data elements to be processed to obtain m output data elements, the computational result is based on at least one of the m output data elements, and m is indivisible by n without leaving a remainder.

5. The method of claim 4, wherein m is a power of two and determining to process the first data using the first subset of the set and to process the second data using the second subset of the set is based on n being a non-power-of-two.

6. The method of claim 1, wherein the first data comprises m input data elements to be processed to obtain m output data elements, the computational result is based on at least one of the m output data elements, and the method comprises processing a different respective subset of the m input data elements in each of a plurality of processing cycles comprising the processing cycle.

7. The method of claim 6, wherein each subset of the m input data elements comprises the same number of m input data elements as each other.

8. The method of claim 6, wherein a first subset of the m input data elements processed in a first processing cycle of the plurality of processing cycles comprises a different number of m input data elements than a second subset of the m input data elements processed in a second processing cycle of the plurality of processing cycles.

9. The method of claim 1, wherein the first data comprises m input data elements to be processed to obtain m output data elements, the computational result is based on at least one of the m output data elements, and the method comprises processing each of the m input data elements using a different respective computation resource of the plurality of computation resources.

10. The method of claim 1, wherein the first data comprises m input data elements and further, real, data to be processed with each of the m input data elements to obtain m output data elements, and the computational result is based on at least one of the m output data elements.

11. The method of claim 10, wherein each of the m input data elements represents a respective weight and the further data represents at least part of a block of an input feature map.

12. The method of claim 10, comprising:
in the processing cycle:
  activating a first activated subset of activated computation resources of the plurality of computation resources for processing a first subset of the m input data elements with the further data, the set comprising the first activated subset; and
  maintaining a first deactivated subset of deactivated computation resources of the plurality of computation resources; and
in a further processing cycle of the processing unit:
  activating a second activated subset of activated computation resources of the plurality of computation resources, different from the first activated subset, for processing a second subset of the m input data elements with the further data, different from the first subset of the m input data elements; and
  maintaining a second deactivated subset of deactivated computation resources of the plurality of computation resources, different from the first deactivated subset.

13. The method of claim 1, wherein:
the first data comprises m input data elements to be processed over c processing cycles to obtain m output data elements, the computational result is based on at least one of the m output data elements and the c processing cycles comprise the processing cycle;
n computation resources of the plurality of computation resources are available per processing cycle of the c processing cycles such that n*c computation resources are available over the c processing cycles;
m computation resources are utilised over the c processing cycles to process a different respective one of the m input data elements; and
(n*c−m) computation resources are utilised over the c processing cycles to process artificial data, the artificial data comprising the second data.

14. The method of claim 1, comprising deriving the second data from real data.

15. The method of claim 14, wherein the real data comprises an array of real data elements and deriving the second data from the real data comprises changing an order of the real data elements within the array.

16. The method of claim 14, comprising:
in a preceding processing cycle preceding the processing cycle, loading the real data into a preceding set of the plurality of computation resources, causing the preceding set to generate a preceding computational result; and
generating the output feature map data based at least in part on the preceding computational result.

17. The method of claim 14, wherein the second data comprises at least one of:
artificial input feature map data derived from the real data by a process comprising changing an order of real input feature map data elements within an array of real input feature map data elements comprised by the real data; or
artificial weight data derived from the real data, wherein the real data comprises preceding real weight data processed by a preceding set of the plurality of computation resources during a preceding processing cycle preceding the processing cycle.

18. A processing unit for generating output feature map data during operation of neural network processing, the processing unit comprising a plurality of computation resources, wherein the processing unit is configured to:
obtain first, real, data to be processed;
determine, based on a number of computation resources of a set of the plurality of computation resources available for use during a processing cycle of the processing unit, to process at least a portion of the first data using a first subset of the set and to load second, artificial, data into a second subset of the set, disjoint from the first subset of the set, the second data comprising at least one artificial data element;
obtain the second data;
in the processing cycle:
load at least the portion of the first data into the first subset of the set, causing the first subset of the set to generate a computational result; and
load the second data into the second subset of the set, the second subset of the set being an artificially activated subset of the set;
inhibit the second data from affecting the output feature map data; and
generate the output feature map data based at least in part on the computational result.

19. The processing unit of claim 18, wherein the processing unit is configured to:
obtain ramping, real, data;
in a ramping processing cycle of the at least one processing cycle, different from the processing cycle, load the ramping data into a ramping set of the plurality of computation resources, different from the set of the plurality of computation resources, to generate a ramping computational result; and
generate the output feature map data based at least in part on the ramping computational result.

20. The processing unit of claim 18, wherein the number of computation resources is n, the first data comprises m input data elements to be processed to obtain m output data elements, the computational result is based on at least one of the m output data elements, and m is indivisible by n without leaving a remainder.

* * * * *